United States Patent [19]

Luce

[11] Patent Number: 4,870,558
[45] Date of Patent: Sep. 26, 1989

[54] MOVING MAGNETIC FIELD ELECTRIC POWER CONVERTER

[76] Inventor: John W. Luce, 1030 S. Sterling Ave., Tampa, Fla. 33629

[21] Appl. No.: 190,719

[22] Filed: May 6, 1988

[51] Int. Cl.⁴ .............................................. H02M 7/00
[52] U.S. Cl. ......................................... 363/87; 363/43; 363/126; 363/129; 363/137
[58] Field of Search ........................ 363/43, 44, 45, 46, 363/84, 85, 87, 88, 126, 128, 129, 135–137

[56] References Cited

U.S. PATENT DOCUMENTS

| | | | |
|---|---|---|---|
| 3,134,068 | 5/1964 | Feltman | 363/87 |
| 3,549,979 | 12/1970 | Stearns et al. | 363/87 |
| 4,161,680 | 7/1979 | Akamatsu | 363/43 |
| 4,255,784 | 3/1981 | Rosa | 363/129 |

OTHER PUBLICATIONS

Lee, "Electronic Transformers and Circuits", Second Edition, 1955, John Wiley & Sons, Inc., New York, pp. 4–5.
Dawes, "A Course in Electrical Engineering, vol. II, Alternating Currents", Fourth Edition, New York and London, McGraw-Hill, pp. 282–285.
Richardson, "Rotating Electric Machinery and Transformer Technology", 1978, Reston Publishing Company, Inc., pp. 428–431.

Primary Examiner—Peter S. Wong
Attorney, Agent, or Firm—Dominik, Stein, Saccocio, Reese, Colitz & Van Der Wall

[57] ABSTRACT

An electric power converter operable by means of a rotating or moving magnetic field having a substantially constant flux density or of a substantially constant magnitude. The electric power converter functions as a AC to DC, DC to AC or DC converter, or as a phase changer/phase shifter or a voltage adjuster. A feature of the converter is the continuous supply of power from the primary phases in contrast to prior art converters in which only the phase having the highest voltage supplies power at any one time. Harmonic current distortion is, therefore, substantially reduced.

33 Claims, 6 Drawing Sheets

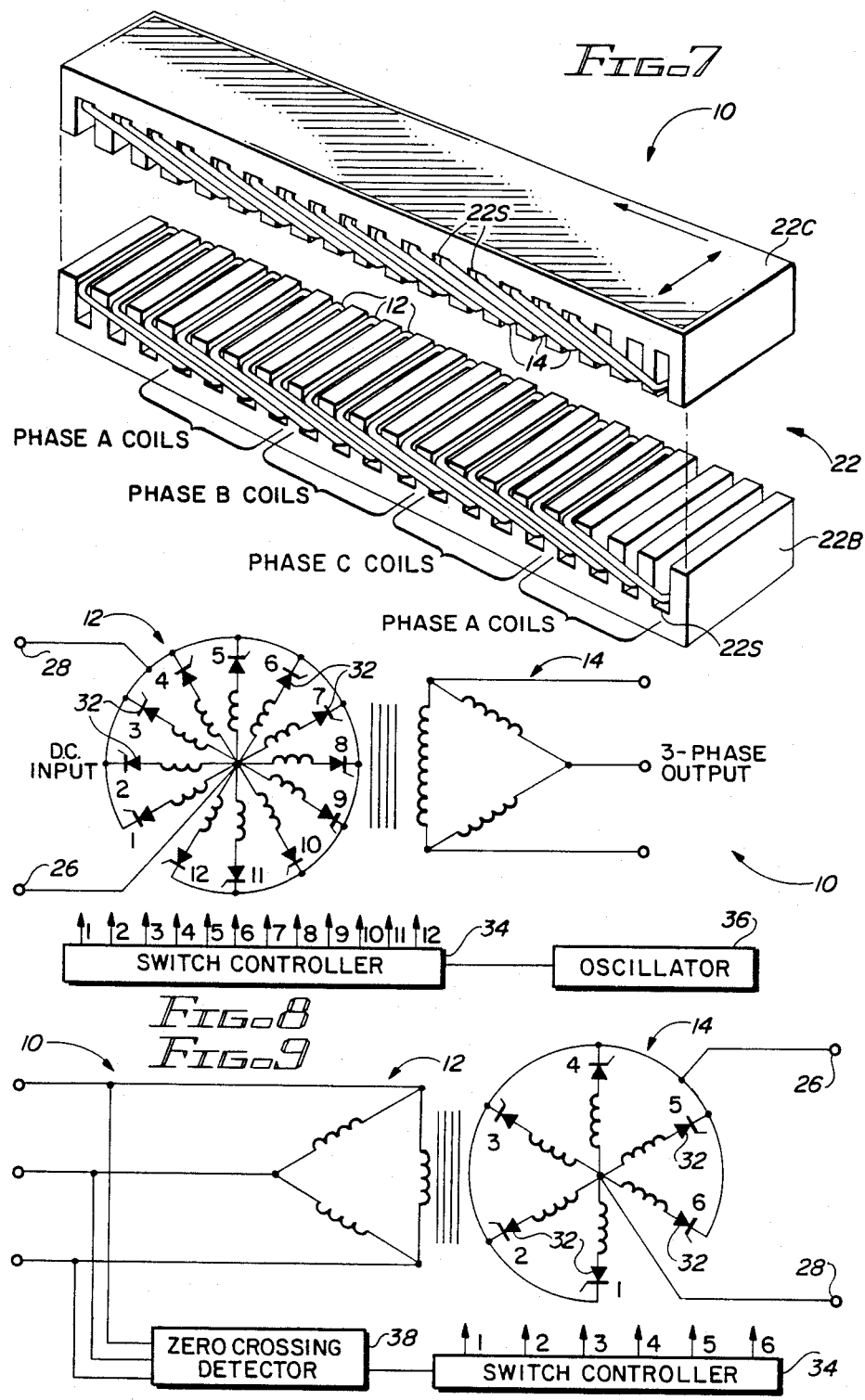

MOVING MAGNETIC FIELD ELECTRIC POWER CONVERTER

BACKGROUND OF THE INVENTION

1. Field of the Invention

This invention relates to the interconversion of electric power between the alternating current (AC) and direct current (DC), forms. More particularly, this invention relates to electrical power conversion through the use of static devices to avoid the use of rotating machinery while minimizing distortion of the input and output power.

2. Description of the Background Art

The conversion of electrical power is typically accomplished by discrete electric components such as rectifiers, thyristors, inductors and capacitors or by rotating machinery.

More particularly, AC to DC conversion is predominately accomplished by rectifying the alternating current to produce a pulsating direct current. Unfortunately, pulsating direct current is satisfactory only for limited applications such as battery charging. When smoother direct current is needed, such as for most electronic applications, the pulsating DC is filtered by means of capacitors or inductors.

Since rectifiers intermittently draw current from the AC supply, harmonic current distortion and low power factor are unavoidable. Furthermore, when capacitive filters are used, current distortion further increases. Thus, additional filtering is usually required to prevent harmonic current distortion, particularly for compliance with U.S. Navy specification (MIL-E-16400) which prohibits harmonic current distortion in shipboard equipment.

The input and output waveform distortions discussed above are typically avoided through the use of a motor-generator set or a synchronous converter, both of which can convert AC to DC. Unfortunately, the expense, size, weight, noise and high maintenance of such machines precludes their wide use.

In regard to conversion of electrical power from DC to AC, electronic inverters are typically used. The inverters produce a square wave output waveform which inherently contains harmonics that result in increased losses and generally poorer operation than if the output was a pure sine wave. Improved inverters have been developed which attempt to approximate a sine wave through the use of six pairs of controlled rectifiers thereby producing an alternating square wave output crudely approximating a sine wave and whose frequency is determined by the firing of the controlled rectifiers. Unfortunately, these six step inverters also draw DC current intermittently rather than continuously.

In some applications, it is desirable to convert power from AC to DC during one time frame and then vice versa at another time. The converter used to convert AC to DC at one time and DC to AC at another is known as a regenerative or bilateral converter. Regenerative converters are useful in electric railways where it is desirable to recover the energy absorbed in decelerating the train and feed it back into the power system. However, electronic regenerative converters produce distortion of the input and output power for basically the same reasons discussed above. Furthermore, regenerative converters may involve as much as two rectifiers and two inverters with a DC link.

Therefore, it is an object of this invention to provide an apparatus and method which overcomes the aforementioned inadequacies of the prior art devices and methods and provides an improvement which is a significant contribution to the advancement of the electric power converter art.

Another object of this invention is to provide an electric power converter for converting alternating current to direct current without the use of rotating machinery such as that found in a motor-generator set or a synchronous converter.

Another object of this invention is to provide an electric power converter for converting AC to DC which continuously draws current from the AC supply (as opposed to intermittently) to minimize harmonic current distortion and low power factor.

Another object of this invention is to provide an electric power converter converting AC to DC having a pulsating output voltage waveform which can be capacitatively or inductively filtered while still minimizing harmonic current distortion and low power factor.

Another object of this invention is to provide an electrical power converter for converting AC to DC to produce an output voltage waveform with less ripple than that achieved by prior art converters.

Another object of this invention is to provide an electric power converter for converting DC to AC as a function of input frequency.

Another object of this invention is to provide an electric power converter to function as a DC to DC converter while minimizing distortion.

Another object of this invention is to provide an electric power converter functioning as a regenerative, bilateral converter.

Another object of this invention is to provide an electric power converter for converting any number of phases greater than one to any other number of phases.

Another object of this invention is to provide an electric power converter functioning as a phase shifter.

Another object of this invention is to provide an electric power converter functioning as a voltage adjuster.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises an electric power converter for converting AC to DC, DC to AC and DC to DC. The electric power converter further may function as a phase changer/phase shifter. Finally, the electric power converter of the invention may function as a voltage adjuster.

More particularly, the electric power converter of the invention comprises an outer ferromagnetic core having a primary winding wired for two or more phases in the same manner as a polyphase AC motor, either synchronous or induction (either squirrel cage or wound rotor). The windings, when energized by polyphase power, produce a rotating magnetic field in the outer core similar to that of a polyphase motor.

The electric power converter of the invention further comprises an inner ferromagnetic core having at least one secondary winding wound much in the same manner as the armature windings of a DC generator. However, preferably, the windings are star connected with the neutral brought out. Further, preferably, the secondary is wound with more phases than that of the primary, such as, for example, three phases on the primary and six or twelve on the secondary.

The inner core is noncontinuously rotatably positioned within the outer core such that the moving (rotating) magnetic field in the outer core is magnetically coupled to the inner core and has a substantially uniform magnitude (constant flux density).

The electric power converter of the invention functions as an AC to DC converter by connecting each of the secondary windings thereof to a diode and then to a common output junction. The voltage output between the output junction and the neutral of the secondary produces an output voltage with ripple which is a function of the number of windings in the secondary. A feature of this converter is that all of the primary phases are continuously supplying power in contrast to prior art converters in which only the phase having the highest voltage supplies power at any one time. Thus, harmonic current distortion is substantially reduced, if not completely eliminated. Furthermore, the core and coils of the converter of the invention may be designed to produce a flat-topped waveform as is usually produced in a DC generator such that the output voltage waveform is essentially free of ripple even with relatively few secondary windings. Finally, the converter may be constructed similarly to a salient pole AC machine to produce a flat-topped waveform.

The electric power converter of the invention functions as a DC to AC converter by winding numerous windings on the primary, each of which is connected to an electric switch such as a gate turn-off (GTO) thyristor with the other sides of the switches being connected together and to a DC source. The gates of the switches are controlled by a control circuit driven by an oscillator having a frequency range or the fixed frequency desired. Advantageously, the DC current consumption is continuous.

The DC to AC converter described above may be further modified to a DC to DC converter by connecting a set of rectifiers to its AC output. To function as a DC to DC converter, the number of primary and secondary phases are preferably increased to six or more phases.

The DC to AC converter of the invention as described above may still further be modified to function as a bilateral converter. More specifically, the DC to AC converter may be controlled by an AC power line instead of the independent oscillator to allow it to convert AC to DC power and supply it to the load. When the load overhauls, DC power is converted to AC and fed back into the supply line in synchronism (frequency and phase) with the line frequency.

The electric power converter of the invention may function as a phase converter or changer to convert two or more phases to any number of phases by simply winding the primary and secondary for the desired number of phases, both being wound for the same number of poles.

The electric power converter of the invention still further may function as a phase shifter by rotatably moving the inner core relative to the outer core. If only limited phase shifting is desired, the connections to the inner core can be simply brought out through flexible leads. However, if continuous phase shifting is desired, the inner core connections are brought out through the use of conventional slip rings and brushes.

Finally, the electric power converter of the invention may function as a voltage adjuster by slidably moving the inner core relative to the outer core. Movement of the inner core partially out of the outer core, will reduce the output voltage. A dummy ferromagnetic core may be connected to the end of the inner core such that the exciting current in the primary will not become excessive.

It is noted that the input primary winding can be wound on the inner or the outer core and the output secondary winding on the other. Alternatively, both the primary and secondary could be wound on the same core. The converter could also be configured such that the magnetic field having a substantially uniform flux density travels in a straight line (instead of rotatably moving). Finally, for higher frequency applications, the primary and secondary windings may be positioned relative to one another with "no core" to produce an "air core" embodiment.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 7 is an exploded view of the electric converter of the invention manufactured in linear form;

FIG. 8 is a schematic diagram of the electric converter of the invention having three phase delta connected output windings and twelve phase star connected input windings illustrating gate turn-off (GTO) thyristors connected thereto and to a DC source, with the gates of the GTOs controlled by a control circuit functioning as a DC-AC converter;

FIG. 9 is a schematic diagram of the electric power converter of the invention showing a similar DC to AC converter embodiment of FIG. 8 controlled by an AC power line to function as a regenerative (bilateral) converter.

Similar reference characters refer to similar parts throughout the several views of the drawings.

DETAILED DESCRIPTION OF THE PREFERRED EMBODIMENT

Figure 1:
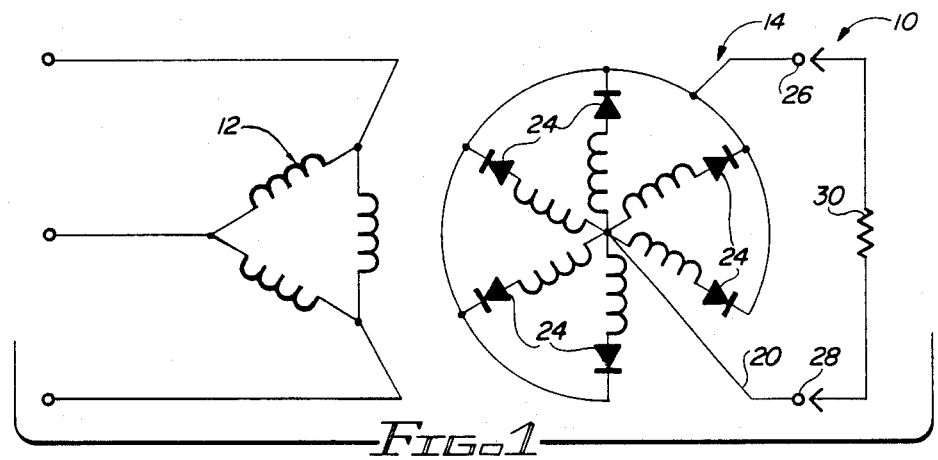
FIG. 1 is a schematic diagram of the electric power converter of the invention having three phase delta connected primary windings and six phase star connected secondary windings with half-wave rectification functioning as AC to DC converter.
Figure 3:
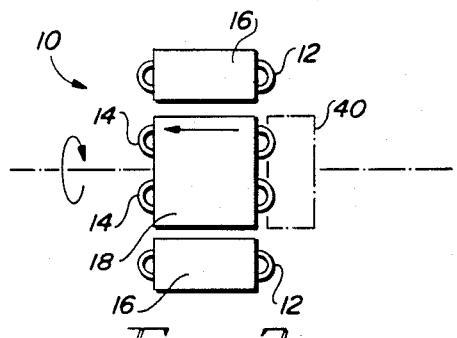
FIG. 3 is a cross-sectional view of the electric power converter of the invention illustrating the primary windings wound on the outer core and the secondary windings wound on the inner core.
Figure 4:
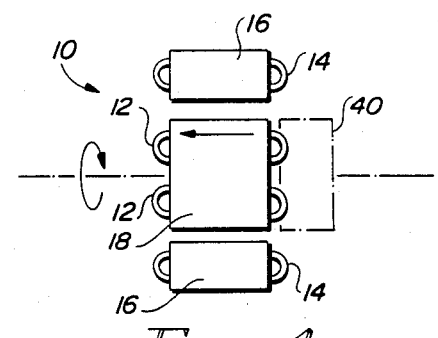
FIG. 4 is a cross-sectional view of the electric power converter of the invention illustrating the primary winding wound on the inner core and the secondary winding wound on the outer core.
Figure 5:
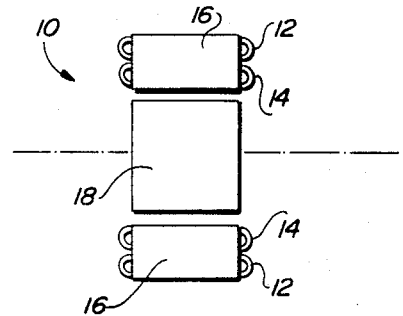
FIG. 5 is a cross-sectional view of the electric power converter of the invention illustrating the primary and secondary windings wound on the outer core.
Figure 6:
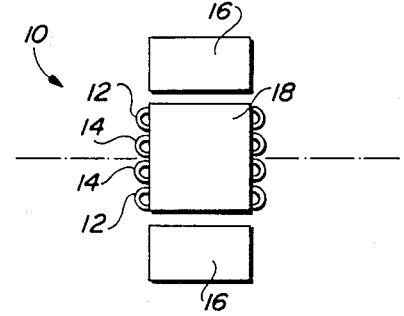
FIG. 6 is a cross-sectional view of the electric power converter of the invention illustrating the primary and secondary winding wound on the inner core.

As illustrated in FIG. 1, the electric power converter 10 of the invention comprises a three phase delta connected primary winding 12 and a six phase star connected secondary winding 14 magnetically coupled together. As shown in FIG. 3, one embodiment of the converter 10 comprises the primary 12 wound on an outer cylindrical ferromagnetic core 16 and the secondary 14 on an inner cylindrical ferromagnetic core 18 positioned therein. Alternatively, as illustrated in FIG. 4, the primary windings 12 may be wound on inner core 18 and the secondary windings 14 may be wound on the outer core 16. Further, without departing from the spirit and scope of this invention, both of the primary and secondary windings 12 and 14 may be wound on the outer core 16 as shown in FIG. 5 or both may be wound on the inner core 18 as shown in FIG. 6.

Preferably, the primary windings 12 are wound on the selected core 16 or 18 much in the same manner as the stator winding of a polyphase AC motor, either synchronous or induction (either squirrel cage or wound rotor). The primary winding may be of multiple phases although three phases are shown to match conventional three phase power. The three phase primary winding may be delta connected as shown in FIG. 1 or wye connected. The windings may be wave, lap, concentric, or otherwise wound.

The secondary windings 14 may likewise be constructed in one of the forms discussed above. Preferably, the secondary winding 14 is star connected as shown in FIG. 1 with the neutral 20 brought out. The secondary winding 14 includes, for most applications, a greater number of phases than that of the primary winding 12. However, for other applications, only one phase may be needed.

As shown in FIG. 7, the electric power converter 10 of the invention may alternatively be constructed in a linear form 22 much in the same manner as a linear motor. Specifically, the linear power converter 22 comprises an elongated ferromagnetic base member 22B having a plurality of slots 22S formed transversely therein and a ferromagnetic cover member 22C configured to be affixed over the top of the base member 22B once the linear converter 22 is wound. The three phase primary windings 12 are alternatively wound in every third slot 22S in the conventional manner. The six phase secondary windings 14 are similarly wound within slots 22S in a manner similar to three phase windings. It is noted that the linear converter 22 is wound in such a manner that the same phase is wound at the beginning and the end so as to compensate for end effects.

It is noted that in both the linear and the cylindrical core embodiments, a moving magnetic field having substantially constant flux density (constant magnitude) is created to magnetically couple the primary and secondary windings. In the cylindrical core embodiments, the moving magnetic field is rotating whereas in the linear embodiment, the moving magnetic field is linearly travelling.

Returning to FIG. 1, the power converter 10 of the invention, when operating as an AC to DC converter, includes a rectifier 24, such as a diode, connected to each of the outputs of the six phase star secondary 14. The cathodes of the diodes 24 are all electrically connected together and brought out as the positive terminal 26. The neutral terminal 28 is also brought out from the secondary 14.

When a three phase power source is connected to the three phase primary winding 12, a magnetic field rotates within the inner and outer core 16 and 18 thereby producing AC voltage in each of the windings of the secondary 14. The diodes 24 rectify the voltage in each of the windings of the secondary 14. Thus, a rippled voltage output as shown in FIG. 2A is produced across the load impedance 30 connected between the positive terminal 26 and the neutral 28.

Figure 2A:
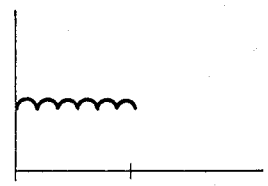
FIG. 2A is a diagram of the output voltage waveform of FIG. 1.
Figure 2B:
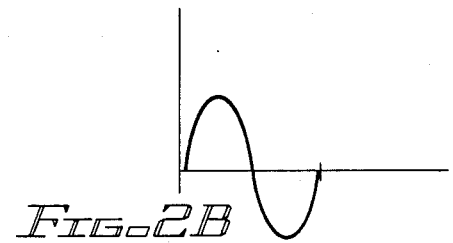
FIG. 2B is a diagram of the input current waveform of FIG. 1.

It is noted that the rippled output shown in FIG. 2A includes six ripples corresponding to the six phases of the star secondary 14, nearly approximating DC. Moreover, the cores 16 and 18 and the windings 12 and 14 may be designed to produce a flat-topped waveform to better approximate a DC output across the load 30. Finally, it is noted that the primary 12 is continuously supplying power to the secondary 14. Thus, the sinusoidal primary current (see FIG. 2B) remains substantially unchanged thereby reducing harmonic current distortion.

Figure 8A:
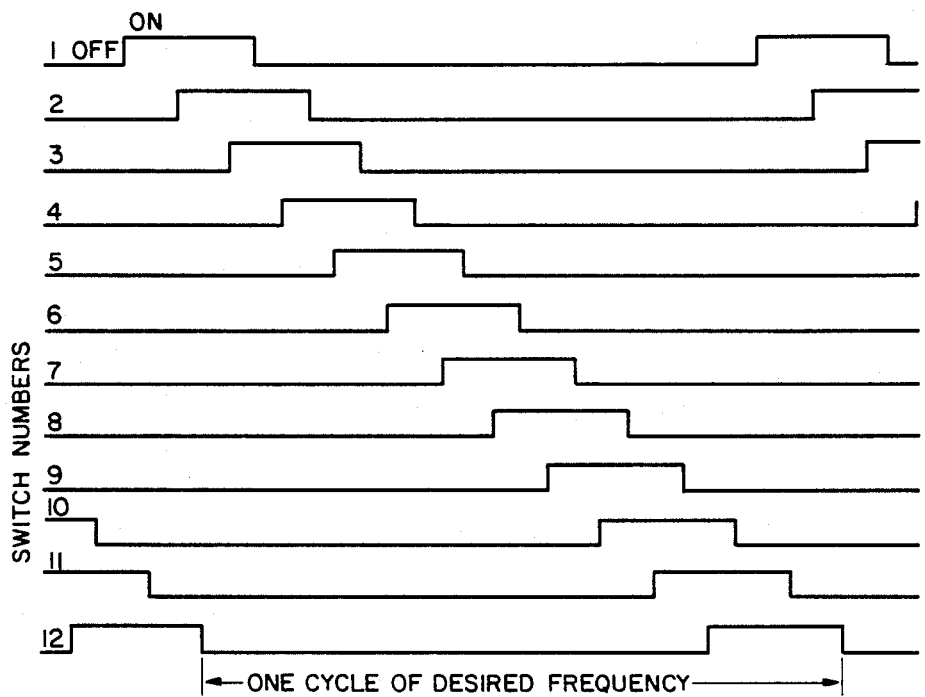
FIG. 8A is a timing diagram of the switch controller of the inverter of the invention and FIG. 8B is the output diagram.

As shown in FIG. 8, the power converter 10 of the invention may function as an inverter by utilizing the primary 12 as its three phase output and the star secondary 14 as a DC input. The star secondary input 14 may comprise twelve phases each of which having an electric switch 32, such as a gate turn off (GTO) thyristor switch, having their outputs connected together and brought out as negative terminal 28. The gates of the GTOs 32 are controlled by means of a switch controller 34 timed by oscillator 36 according to the timing diagram of FIG. 8A.

Figure 8B:
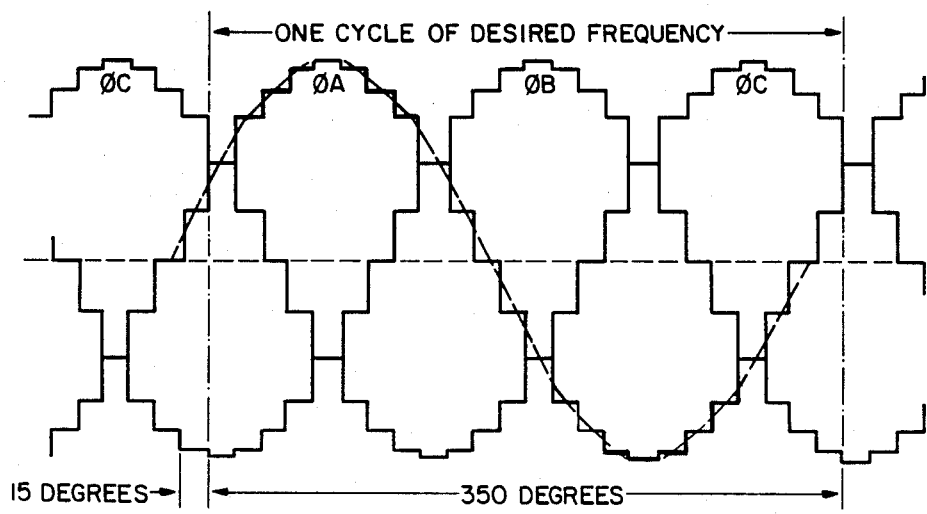

It is seen that by gating each of the GTOs in the sequence and with the timing reflected in FIG. 8A, three adjacent GTOs are gated, the first one of which is turned OFF leaving two gated. Another succeeding adjacent GTO is then turned ON for a repeated total of three. This alternating three-two-three-two sequence is continuously repeated so that at all times at least two GTOs are ON and such that no two GTOs need to be switched ON (or OFF) simultaneously. The stepped output waveform of FIG. 8B is therefore obtained.

Utilizing the timing of FIG. 8A, the magnetic field in the core 16 and 18 never totally collapses which would otherwise produce a large inductive kick. Further, the rotating magnetic field moves in discrete steps and with a rate sufficient to preclude steady state conditions. Thus, the stepping interval is preferably significantly shorter than five electrical time constants of the converter 10.

The power converter 10 of the invention functioning as an inverter as shown in FIG. 8 may be modified to function as a synchronized, regenerative converter by connecting a zero crossing detector 38 to the primary 12 and utilizing the zero crossing detection as an oscillator to time the switch controller 34 (see FIG. 9). In this manner, when operating as an AC to DC converter, the circuit functions much in the same manner as described above in regard to FIG. 1. Since the switch controller 34 is synchronized in frequency and phase with the primary 12, when the load overhauls and feeds DC power into the secondary 14, such power will be fed back to the AC line of the primary 12. It is noted that the electronic switches 32 must be bilateral so as to conduct in either direction when turned ON.

Returning to FIGS. 3 and 4, it is noted that the outer and inner core 16 and 18 may be constructed so as to be adjustably shifted rotatably relative to one another. The outer core 16 may therefore be rotatably adjusted relative to the inner core 18 in the direction (same or opposite) of the rotating magnetic field. The rotation of the cores 16 and 18 relative to one another thus causes the converter 10 to function as a phase shifter.

It is also noted that the outer and inner cores 16 and 18 may additionally or alternatively be adjustably shifted slideably relative to one another allowing the inner core 18 to be slid partially out of the outer core 16 in a direction perpendicular to the magnetic field. It is seen that as the inner core 18 is progressively slid out of the outer core 16, the magnetic flux linking the secondary is reduced thereby reducing the output voltage. Hence, longitudinal adjustment of the outer core relative to the inner core may be utilized as a means for reducing the output voltage. A dummy core 40 is connected relative to the end of the inner core 16 to prevent the exciting current in the primary from becoming excessive.

Likewise, the linear embodiment 22 may be constructed such that the primary windings 12 may be moved relative to the secondary windings 14 in the direction of the travelling magnetic field to function as a phase shifter or in a direction perpendicular to the direction of the travelling magnetic field to function as a voltage adjuster.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,

What is claimed is:

1. A method for electric power conversion, comprising the steps of:
   producing a polyphase moving magnetic field having substantially constant flux density by means of a first polyphase winding when input power is supplied to said first polyphase winding; and
   magnetically coupling a second winding with said moving magnetic field to produce power output.

2. The method as set forth in claim 1, wherein said second winding comprises a second polyphase winding and wherein said power output comprises polyphase power output having a phase output for each phase of said second polyphase winding.

3. The method as set forth in claim 1, wherein said step of producing a polyphase moving magnetic field comprises producing a polyphase moving magnetic field in a ferromagnetic material.

4. The method as set forth in claim 1, wherein said step of producing a polyphase moving magnetic field comprises producing a polyphase substantially linearly travelling magnetic field.

5. The method as set forth in claim 1, wherein said step of producing a polyphase moving magnetic field comprises producing a polyphase rotating magnetic field.

6. The method as set forth in claim 2, further including the step of rectifying said phase output of said second polyphase winding.

7. The method as set forth in claim 6, further including the step of combining said rectified phase outputs to produce a substantially DC power output.

8. The method as set forth in claim 6, wherein said step of magnetically coupling a second polyphase winding with said moving magnetic field comprises magnetically coupling said second polyphase winding with said moving magnetic field to produce a flat-topped polyphase power output including a flat-topped phase output for each of the phases of said second polyphase winding, wherein said step of rectifying said phase output comprises rectifying said flat-topped phase outputs and wherein said step of combining said rectified phase outputs comprises combining said rectified flat-topped phase outputs.

9. The method as set forth in claim 2, wherein said input power comprises DC input power and wherein said step of producing said polyphase moving magnetic field comprises the steps of:
   connecting said DC input power to a switch connected to each of the phases of said first polyphase winding; and
   closing and opening said switches in a controlled manner to produce a step-wise moving magnetic field.

10. The method as set forth in claim 9, further including means for synchronizing said closing and opening of said switches with said polyphase power output thereby allowing bilateral power conversion.

11. The method as set forth in claim 9, wherein said closing and opening of said switches do not occur simultaneously.

12. The method as set forth in claim 1, further including the step of adjustably shifting said first polyphase winding relative to said second winding to adjustably reduce said power output.

13. The method as set forth in claim 1, further including the step of adjustably shifting said first polyphase winding relative to said second winding to adjustably shift the phase of said power output.

14. A static electric power converter comprising a plurality of input windings, at least one output winding, and means for linking said input windings with said output winding by a moving magnetic field of substantially uniform magnitude, whereby said moving magnetic field induces an output voltage in said output winding as lines of flux of said moving magnetic field move through said output winding.

15. The static electric power converter as set forth in claim 14, wherein said input windings are wound on one of an inner core and an outer core and said output winding is wound on one of said inner core and outer core.

16. The static electric power converter as set forth in claim 15, wherein said inner core and said outer core is composed of a ferromagnetic material.

17. The static electric power converter as set forth in claim 15, wherein said input windings are wound on one of said outer core and inner core and said output winding is wound on the other.

18. The static electric power converter as set forth in claim 15, further including means for adjustably shifting said inner core rotatably relative to said outer core.

19. The static electric power converter as set forth in claim 15, further including means for adjustably shifting said inner core longitudinally relative to said outer core.

20. The static electric power converter as set forth in claim 14, further including a dummy core connected to an end of said inner core.

21. The static electric power converter as set forth in claim 14, wherein said input windings and said output winding are each wound on a noncylindrical base.

22. The static electric power converter as set forth in claim 21, further including means for adjustably shifting said input windings relative to said output winding in the direction of said moving magnetic field.

23. The static electric power converter as set forth in claim 21, further including means for adjustably shifting said input windings relative to said output winding in a direction perpendicular to the direction of said moving magnetic field.

24. The static electric power converter as set forth in claim 23, further including a dummy base connected to an end of one of said noncylindrical bases.

25. The static electric power converter as set forth in claim 21, wherein each of said noncylindrical is ferromagnetic.

26. The static electric power converter as set forth in claim 14, including a plurality of said output winding in which are induced phase output voltages.

27. The static electric power converter as set forth in claim 26, further including rectifier means connected to each of said output windings to produce substantially DC voltage from said phase output voltages.

28. The static electric power converter as set forth in claim 26, further including an electric switch connected to each of said input windings and a switch controller means for actuating said electric switch to produce stepped said moving magnetic field when DC input power is connected to said electric switches.

29. The static electric power converter as set forth in claim 28, further including means for detecting the phase of a polyphase power source connected to said output windings such that said switch controller means actuates said electric switches to produce said stepped moving magnetic field in synchronism with said polyphase power source.

30. A method for converting polyphase AC power to substantially DC power, comprising the steps of:
producing a polyphase magnetic field of a substantially constant flux density in a ferromagnetic material by means of a polyphase primary winding;
magnetically coupling a polyphase secondary winding with said magnetic field so as to produce a phase output for each of the phases of the polyphase secondary winding;
means for rectifying each said output phase to produce a rectified phase output; and
means for connecting said rectified phase outputs to a common terminal such that the output voltage between said output terminal and a neutral of said secondary winding comprises a rippled, substantially DC output voltage.

31. A method for converting polyphase AC power to substantially DC power, comprising the steps of:
producing a polyphase magnetic field in a ferromagnetic core by means of a polyphase primary winding;
magnetically coupling a polyphase secondary winding wound on a second ferromagnetic core with the magnetic field so as to produce a phase output for each of the phases of the polyphase secondary winding, the step of magnetically coupling comprising the step of fixedly positioning one of the cores inside of the other;
means for rectifying each said output phase to produce a rectified phase output; and
means for connecting said rectified phase outputs to a common terminal such that the output voltage between said output terminal and a neutral of said secondary winding comprises a rippled, substantially DC output voltage.

32. A polyphase power converter for converting polyphase AC power to substantially DC power comprising in combination:
a ferromagnetic outer core;
a ferromagnetic inner core;
means for fixedly positioning said inner core inside said outer core;
a primary winding wound on one of said outer core and inner core;
a secondary winding wound upon one of said outer core and inner core;
rectifier means connected to an output of each phase of said secondary winding; and
means for connecting the outputs of said rectifier to a common terminal such that the output voltage between said output terminal and a neutral of said secondary winding comprises a rippled, substantially DC output voltage when said polyphase primary winding is connected to the AC power source.

33. The converter as set forth in claim 32, wherein said polyphase primary winding is wound on one of said outer core and said inner core and said polyphase secondary winding is wound on the other said outer core and inner core.

* * * * *